(12) United States Patent
Gu et al.

(10) Patent No.: US 12,321,002 B2
(45) Date of Patent: Jun. 3, 2025

(54) POLARIZER, ELECTRONIC DEVICE AND METHOD OF PREPARING POLARIZER

(71) Applicant: BOE Technology Group Co., Ltd., Beijing (CN)

(72) Inventors: Xin Gu, Beijing (CN); Guangcai Yuan, Beijing (CN); Xue Dong, Beijing (CN); Jiahui Han, Beijing (CN); Hua Huang, Beijing (CN); Pengxia Liang, Beijing (CN); Kang Guo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 713 days.

(21) Appl. No.: 17/424,337

(22) PCT Filed: Mar. 2, 2020

(86) PCT No.: PCT/CN2020/077480
§ 371 (c)(1),
(2) Date: Jul. 20, 2021

(87) PCT Pub. No.: WO2021/174392
PCT Pub. Date: Sep. 10, 2021

(65) Prior Publication Data
US 2022/0308275 A1 Sep. 29, 2022

(51) Int. Cl.
*G02F 1/1335* (2006.01)
*G02B 5/30* (2006.01)

(52) U.S. Cl.
CPC ......... *G02B 5/3058* (2013.01); *G02B 5/3016* (2013.01); *G02F 1/133548* (2021.01);
(Continued)

(58) Field of Classification Search
CPC ... G02B 5/30; G02B 5/3016; G02F 1/133548; G02F 1/1347; C09K 2323/00; C09K 2323/03; C09K 2323/031
(Continued)

(56) References Cited

U.S. PATENT DOCUMENTS 10,353,238 B2   7/2019   Zha
10,502,881 B2   12/2019  Li
(Continued)

FOREIGN PATENT DOCUMENTS

CN   101154571 A   4/2008
CN   105700268 A   6/2016
(Continued)

OTHER PUBLICATIONS

Mar. 2, 2023—(CN) Office Action Appn No. 202080000214.2 with English Translation.

*Primary Examiner* — Ruiyun Zhang
(74) *Attorney, Agent, or Firm* — Banner & Witcoff, Ltd.

(57) ABSTRACT

A polarizer, an electronic device and a method of preparing the polarizer are provided. The polarizer includes a base substrate and a metal wire grid structure provided on the base substrate. The metal wire grid structure includes a plurality of metal wire grid layers and one or more dielectric layers stacked between adjacent metal wire grid layers of the metal wire grid layers. Each of the plurality of metal wire grid layers includes a plurality of metal wire strips periodically arranged in a first direction parallel to a surface of the base substrate, and each of the plurality of metal wire grid layers is stacked in a second direction perpendicular to the surface of the base substrate, and a period of the metal wire strips in each of the plurality of metal wire grid layers is less than or equal to 300 nm.

17 Claims, 5 Drawing Sheets

(52) U.S. Cl.
CPC ...... *C09K 2323/00* (2020.08); *C09K 2323/03* (2020.08); *C09K 2323/031* (2020.08)

(58) Field of Classification Search
USPC .......................................... 428/1.1, 1.3, 1.31
See application file for complete search history.

(56) References Cited

U.S. PATENT DOCUMENTS

| | | | |
|---|---|---|---|
| 2008/0094547 A1* | 4/2008 | Sugita | G02B 5/3058 359/487.03 |
| 2017/0261806 A1* | 9/2017 | Niu | G02F 1/1368 |

FOREIGN PATENT DOCUMENTS

| | | | |
|---|---|---|---|
| CN | 106444159 | * | 2/2017 |
| CN | 106444159 A | | 2/2017 |
| CN | 108152877 A | | 6/2018 |
| CN | 108447872 A | | 8/2018 |
| CN | 110133909 A | | 8/2019 |
| CN | 110707126 A | | 1/2020 |
| EP | 3767673 A1 | | 1/2021 |
| WO | 2017133103 A1 | | 8/2017 |

* cited by examiner

POLARIZER, ELECTRONIC DEVICE AND METHOD OF PREPARING POLARIZER

This application is a U.S. National Phase Entry of International Application No. PCT/CN2020/077480 filed on Mar. 2, 2020, designating the United States of America. The present application claims priority to and the benefit of the above-identified applications and the above-identified applications are incorporated by reference herein in their entirety.

TECHNICAL FIELD

Embodiments of the present disclosure relate to a polarizer, an electronic device and a method of preparing the polarizer.

BACKGROUND

Liquid Crystal Display (LCD) has advantages of low cost, super high resolution, large size and highly mature in technology. In recent years, Double-Cell LCD that achieves high contrast and Wide Color Gamut LCD have gained increasing attention. These products use polarizers with high polarization characteristics to obtain polarized light.

SUMMARY

At least one embodiment of the present disclosure provides a polarizer, comprising: a base substrate, and a metal wire grid structure provided on the base substrate. The metal wire grid structure comprises: a plurality of metal wire grid layers, each of the plurality of metal wire grid layers comprises a plurality of metal wire strips arranged periodically in a first direction parallel to a surface of the base substrate, and each of the plurality of metal wire grid layers is stacked in a second direction perpendicular to the surface of the base substrate, and one or more dielectric layers stacked between adjacent metal wire grid layers of the plurality of metal wire grid layers, a period of the metal wire strips in each of the plurality of metal wire grid layers is less than or equal to 300 nm.

For example, in the polarizer provided by at least one embodiment of the present disclosure, the metal wire strips in the plurality of metal wire grid layers have a relative positional relationship in the second direction, which is selected from one of overlapping, complementary and partial overlapping.

For example, in the polarizer provided by at least one embodiment of the present disclosure, the dielectric layer is selected from an inorganic compound dielectric layer, an organic compound dielectric layer and a combination thereof, and the inorganic compound dielectric layer has an inorganic compound selected from silicon oxide, silicon nitride, silicon oxynitride and a mixture thereof, and the organic compound dielectric layer has an organic compound which is thermal curing resin glue or light curing resin glue with a heat-resistant temperature greater than 100° C.

For example, in the polarizer provided by at least one embodiment of the present disclosure, at least one of the one or more dielectric layers sequentially comprises in a direction away from the base substrate: a first dielectric layer configured as a protective layer, and the first dielectric layer is an inorganic compound dielectric layer formed of silicon oxide, silicon nitride, or an organic compound dielectric layer formed by thermal curing resin glue or light curing resin glue with a heat-resistant temperature greater than 100° C.; a second dielectric layer configured as a planarization layer, and the second dielectric layer is an organic compound dielectric layer; a third dielectric layer configured as a bonding promotion layer, and the third dielectric layer is an inorganic compound dielectric layer formed of silicon nitride; and a fourth dielectric layer configured as a protective layer, and the fourth dielectric layer is an inorganic compound dielectric layer formed of silicon oxide.

For example, in the polarizer provided by at least one embodiment of the present disclosure, the metal wire strips are formed of material selected from aluminum, titanium, silver, gold, copper, and an alloy formed by one or more of these metals.

For example, in the polarizer provided by at least one embodiment of the present disclosure, the polarizer further comprises a protective layer on a side of the metal wire grid structure away from the base substrate.

For example, in the polarizer provided by at least one embodiment of the present disclosure, the protective layer is formed of material selected from one of silicon oxide, silicon nitride, silicon oxynitride, an organic compound, and a mixture thereof, and the organic compound is thermal curing resin glue or light curing resin glue with a heat-resistant temperature greater than 100° C.

For example, in the polarizer provided by at least one embodiment of the present disclosure, the polarizer meets one or more of the following: two to four metal wire grid layers are provided; the metal wire strips in at least two or more of the plurality of metal wire grid layers have identical or different periods, and the periods are 40~200 nm; the metal wire strips in at least two or more of the plurality of metal wire grid layers have identical or different widths, and the widths are 20~150 nm; the metal wire strips in at least two or more of the plurality of metal wire grid layers have identical or different heights, and the heights are 160~300 nm; and the metal wire strips in at least two or more of the plurality of metal wire grid layers have identical or different aspect ratios.

In an example, substantially no dielectric layer is provided between the metal wire strips.

At least one embodiment of the present disclosure provides a method of preparing a polarizer, comprising: providing a base substrate, and forming a metal wire grid structure on the base substrate. The metal wire grid structure comprises: a plurality of metal wire grid layers, each of the plurality of metal wire grid layers comprises a plurality of metal wire strips arranged periodically in a first direction parallel to a surface of the base substrate, and the plurality of metal wire grid layers are stacked in a second direction perpendicular to the surface of the base substrate, and one or more dielectric layers stacked between adjacent metal wire grid layers of the plurality of metal wire grid layers, a period of the metal wire strips in each of the plurality of metal wire grid layers is less than or equal to 300 nm.

For example, in the method provided by at least one embodiment of the present disclosure, forming the metal wire grid structure on the base substrate comprises: alternately forming the plurality of metal wire grid layers and the one or more dielectric layers of the metal wire grid structure on the base substrate.

For example, in the method provided by at least one embodiment of the present disclosure, the metal wire strips are formed by using material selected from aluminum, titanium, silver, gold, copper, and an alloy formed by one or more of these metals.

For example, in the method provided by at least one embodiment of the present disclosure, the metal wire strips of at least one of the metal wire grid layers of the metal wire grid structure are formed by a nanoimprinting process.

For example, in the method provided by at least one embodiment of the present disclosure, forming the one or more dielectric layers of the metal wire grid structure is selected from one of the following: forming an inorganic compound dielectric layer by a chemical vapor deposition process, forming an organic compound dielectric layer by a spin coating process or a blade coating process, and forming an inorganic compound dielectric layer by a chemical vapor deposition process, and forming an organic compound dielectric layer by a spin coating process or a blade coating process.

In at least one example, forming the one or more dielectric layers of the metal wire grid structure is such that no dielectric layer is provided between the metal wire strips.

For example, the method provided by at least one embodiment of the present disclosure further comprises forming a protective layer on a side of the metal wire grid structure away from the base substrate.

At least one embodiment of the present disclosure also provides an electronic device, comprising at least one of the polarizers.

For example, in the electronic device provided by at least one embodiment of the present disclosure, the electronic device comprises a liquid crystal display panel.

In at least one example, the liquid crystal display panel is a double-cell type liquid crystal display panel.

For example, the double-cell type liquid crystal display panel further comprises an array substrate, the polarizer is provided on a side of the array substrate, or the array substrate forms a dielectric layer for providing the polarizer.

BRIEF DESCRIPTION OF THE DRAWINGS

In order to clearly illustrate the technical solutions of the embodiments of the present disclosure, the drawings of the embodiments will be briefly described in the following. It is apparent that the described drawings in the following are only related to some embodiments of the present disclosure and are not limitative of the present disclosure.

DETAILED DESCRIPTION

Figure 1:
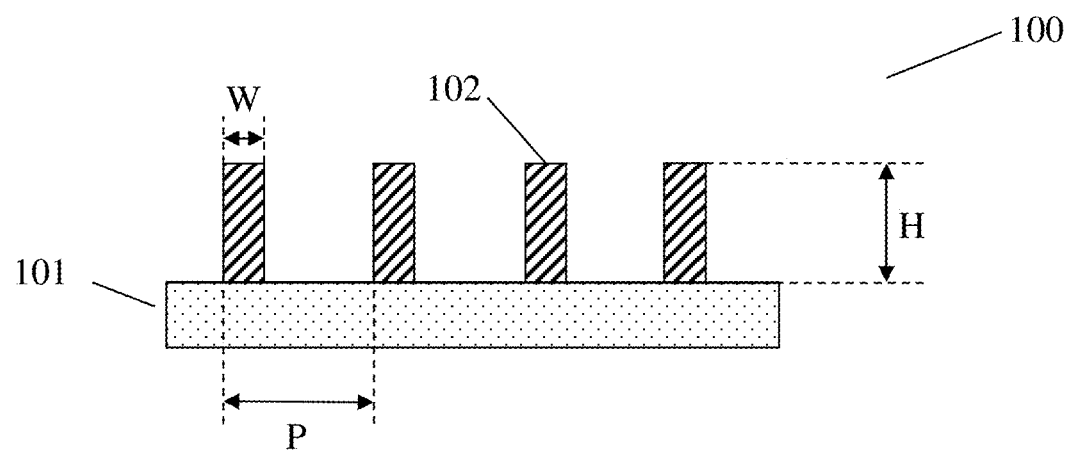
FIG. 1 is a schematically structural view of a wire grid polarizer.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a portion but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," or the like, which are used in the description and the claims of the present application for disclosure, are not intended to indicate any sequence, amount or importance, but for distinguishing various components. The terms "comprise," "comprising," "include," "including," or the like, are intended to specify that the elements or the objects stated before these terms encompass the elements or the objects and equivalents thereof listed after these terms, but do not preclude other elements or objects. The terms, such as "connect/connecting/connected," or the like, are not limited to a physical connection or mechanical connection, but may include an electrical connection/coupling, directly or indirectly. The terms "on," "under," "left," "right," or the like are only used to indicate relative position relationship, and when the absolute position of the object which is described is changed, the relative position relationship may be changed accordingly.

It should be noted that because the respective structures involved in the embodiments of the present disclosure usually have dimensions on the order of millimeters (mm), micrometers (μm), sub-micrometers (100 nm~1.0 μm), or nanometers (nm), for the sake of clarity, the dimensions of the respective structures in the drawings of the embodiments of the present disclosure are exaggeratedly enlarged, and do not represent actual dimensions.

Polarizers may include organic polarizers and metal wire grid polarizers. In organic polarizers, polyvinyl alcohol (PVA) films are usually used for polarization. After dyeing, the PVA film absorbs iodine molecules with bidirectional absorption function, and by stretching, the iodine molecules are arranged in an orderly manner on the PVA film, thereby forming a polarizing film with uniform bidirectional absorption performance, which has a transmission axis perpendicular to the stretching direction.

Metal Wire Grid Polarizer (WGP) is a kind of polarizer with high polarization characteristics, which can allow a component of the incident light with an electric field direction perpendicular to the wire grid direction to pass through, and can reflect a component of the incident light with an electric field direction parallel to the wire grid direction. Based on such working principle, the metal wire grid polarizer can reflect the reflected light back to the metal grid polarizer by adding an anti-reflection film or the like to reuse this part of the light. The metal wire grid polarizer has a far greater ability to transmit incident light than a traditional polarizer, and its transmittance can reach more than 90%, and it has good contrast characteristics.

More specifically, the metal wire grid polarizer includes a metal wire grid, which includes a plurality of parallel metal wire strips having a certain width (W), height (H), and period (P). Along a direction of the metal wire strips (namely, an extending direction of the metal wire strips), which is the transmission direction, the incident light can be divided into light with a vibration direction parallel to the transmission direction and light with a vibration direction perpendicular to the transmission direction. The light with a vibration direction perpendicular to the transmission direction cannot pass through the polarizer, while the light with a vibration direction parallel to the transmission direction can pass through the polarizer, so that the linearly polarized light which is polarized along the transmission direction can be obtained.

Because the metal wire grid polarizers can achieve excellent durability in high temperature or high humidity environment, compared to traditional polarizers made of organic materials, the metal wire grid polarizers have incomparable advantages in many fields.

The inventors have noticed that a wire grid polarizer with superior polarization characteristics and light transmittance is very suitable for use as a built-in polarizer with high polarization characteristics. On the other hand, the smaller the period of the metal wire grid in the metal wire grid polarizer is and the higher the height of the metal wire grid is, the better the polarization characteristics of the polarizer is. However, when the height of the metal wire grid is too high, the metal wire grid may fall over, which results in deterioration of the polarization characteristics of the metal wire grid polarizer.

FIG. 1 illustrates a metal wire grid polarizer 100. The metal wire grid polarizer 100 includes a base substrate 101 and a series of metal wire strips 102, namely, a metal wire grid, formed on the base substrate 101 with a certain period (P), height (H), and width (W). The metal material used to form the metal wire grid may be, for example, copper, aluminum, titanium, silver, gold, etc., or an alloy of these metal materials. The material and structure of the metal wire grid will both affect the optical characteristics of the polarizer. For example, when the period of the metal wire grid is not greater than 140 nm and the metal of aluminum is used, the polarization efficiency of the metal wire grid polarizer for visible light can reach 99.9%. In addition, when the period remains the same and the height does not exceed a certain height, the polarization characteristics of the metal wire grid polarizer increase with an increase of the grating height.

Figure 2:
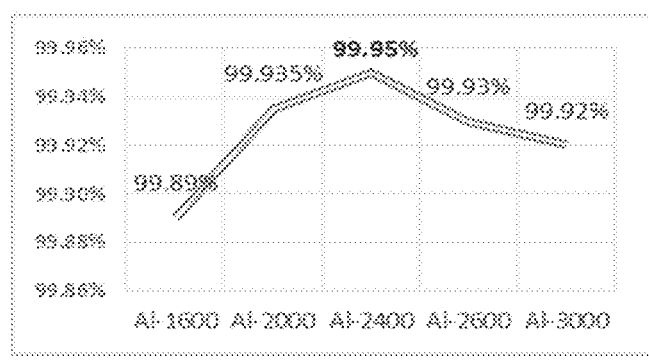
FIG. 2 is a chart illustrating an effect of an aspect ratio of the wire grid layer on the polarization efficiency of the wire grid polarizer.

FIG. 2 is a chart illustrating an effect of the aspect ratio of the metal wire strips in the metal wire grid on the polarization efficiency of the metal wire grid polarizer, in which the period of the metal wire strips in the metal wire grid remains unchanged, while the height of the metal wire strips changes. Referring to FIG. 2, for the aluminum wire grid with a period of 140 nm, when the wire grid height increases from the initial 1600 Å (i.e., 160 nm), the polarization efficiency of the metal wire grid polarizer gradually increases, and when the wire grid height is 2400 Å (i.e., 240 nm), the polarization efficiency of the metal wire grid polarizer can reach a maximum of 99.95%. However, when the height of the metal wire grid is further increased, the polarization efficiency of the metal wire grid polarizer turns to decrease, which is mainly caused by falling-over of a part of metal wire strips.

Figure 3:
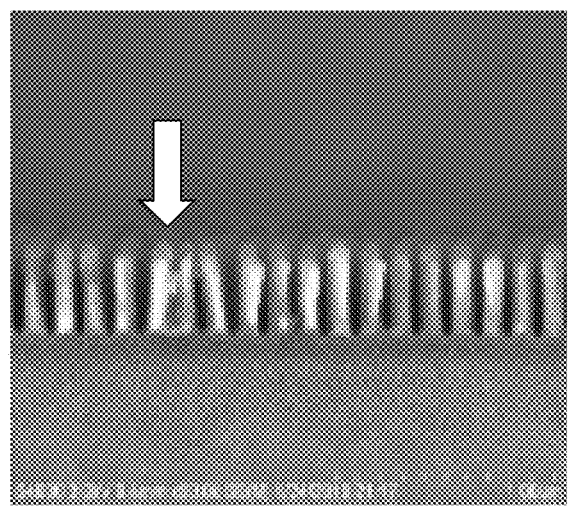
FIG. 3 is an electron micrograph illustrating that the metal wire grid falls over when the aspect ratio is too high.

FIG. 3 is an electron micrograph illustrating that the metal wire grid falls over when the aspect ratio is too high. As illustrated in FIG. 3, for the metal wire grid formed on the base substrate, when the aspect ratio of the metal wire strips of the metal wire grid is too high, a part of the metal wire strips (see the ARROW) of the metal wire grid polarizer becomes inclined. As a result, the wire grid period at the location where the part of metal wire strips lies is changed, so that the wire grid period is no longer consistent for the entire metal wire grid, and the polarization efficiency of the metal wire grid polarizer is deteriorated.

At least one embodiment of the present disclosure provides a polarizer, which includes a base substrate and a metal wire grid structure provided on the base substrate. The metal wire grid structure includes a plurality of metal wire grid layers and one or more dielectric layers stacked between adjacent metal wire grid layers of the plurality of metal wire grid layers. Each of the plurality of metal wire grid layers includes a plurality of metal wire strips periodically arranged in a first direction parallel to the surface of the base substrate, and each of the plurality of metal wire grid layers is stacked in a second direction perpendicular to the surface of the base substrate.

In at least one example, substantially no material of the dielectric layer between adjacent metal wire grid layers is provided between the metal wire strips of the metal wire grid structure of the polarizer. If the material of the dielectric layer enters between the metal wire strips, a slight loss of optical transmittance will be present. Therefore, the less the material of the dielectric layer enters between the metal wire strips, the better. In at least one example, "substantially" refers to that the volume of the dielectric layer presented between the metal wire strips of the metal wire grid structure of the polarizer is less than 20% of the volume of the gap between the metal wire strips. For example, the volume of the dielectric layer presented between the metal wire strips of the metal wire grid structure of the polarizer is less than 10% of the volume of the gap between the metal wire strips. For example, the volume of the dielectric layer presented between the metal wire strips of the metal wire grid structure of the polarizer is less than 5% of the volume of the gap between the metal wire strips. For example, the volume of the dielectric layer presented between the metal wire strips of the metal wire grid structure of the polarizer is less than 1% of the volume of the gap between the metal wire strips. In at least one example, no dielectric layer is provided between the metal wire strips of the metal wire grid structure of the polarizer.

In at least one embodiment of the present disclosure, a first metal wire grid layer with a relatively small height is formed on a base substrate, and then a dielectric layer is formed on the first metal wire grid layer, and a second metal wire grid layer is formed on the dielectric layer, thereby a stacked metal wire grid polarizer is obtained. By the plurality of metal wire grid layers stacked in a same direction in the metal wire grid polarizer, the total height of the metal wire grid layer is increased, thereby avoiding the deterioration of the polarization characteristics of the metal wire grid polarizer due to the falling-over of the metal wire grid. For example, by the stacked metal wire grid structure, and with appropriate metal wire grid period (for example, about 140 nm) and metal material (for example, aluminum or aluminum alloy), the metal wire grid polarizer of at least one embodiment of the present disclosure can achieve a polarization efficiency of 99.99% or higher.

Figure 4A:
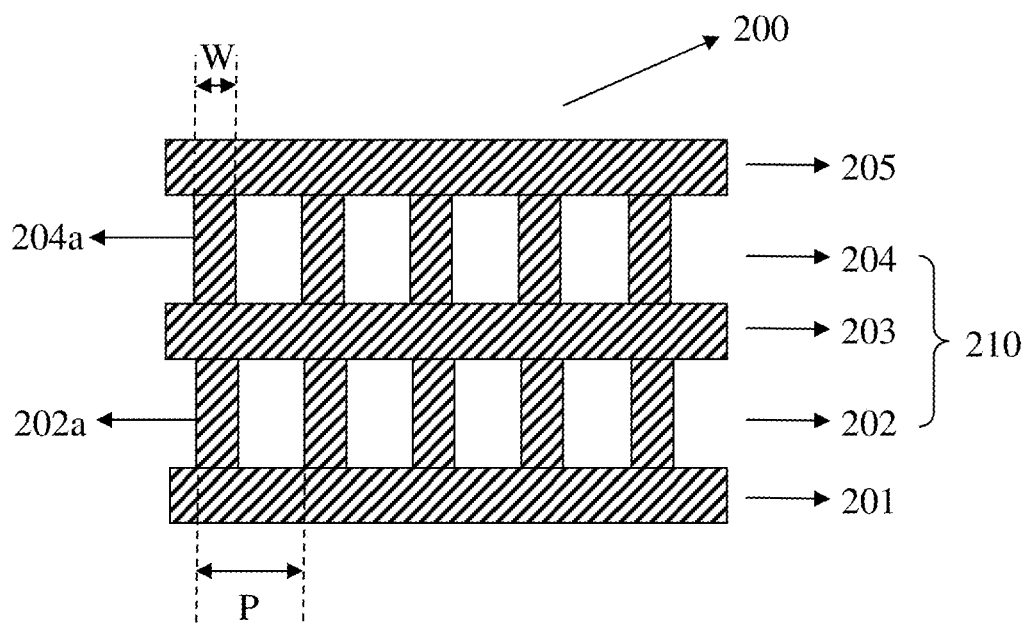
FIG. 4A is a schematically structural view of a wire grid polarizer provided by an embodiment of the present disclosure.
Figure 4B:
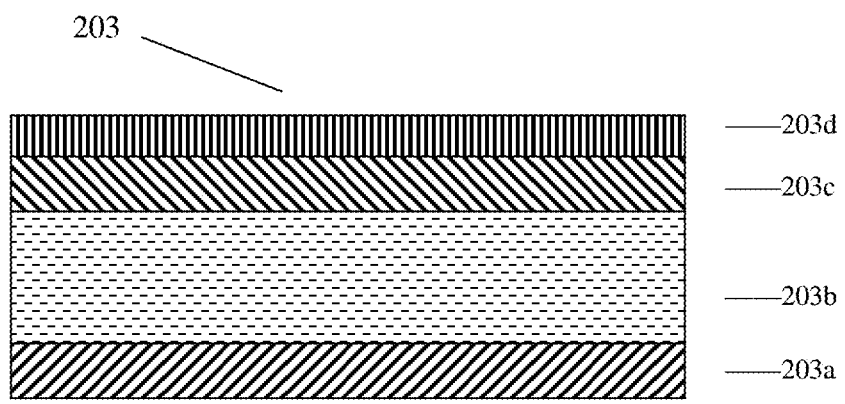
FIG. 4B is a schematically structural view of the dielectric layer used in the wire grid polarizer as illustrated in FIG. 4A.

FIG. 4A is a schematically structural view of a wire grid polarizer 200 provided by an embodiment of the present disclosure, and FIG. 4B is a schematically structural view of an exemplary dielectric layer 203 used in the wire grid polarizer 200 as illustrated in FIG. 4A. Referring to FIG. 4A, the polarizer 200 of the embodiment includes a base substrate 201 and a metal wire grid structure 210 provided on the base substrate 201. The metal wire grid structure 210 includes two stacked metal wire grid layers, namely, a first metal wire grid layer 202 and a second metal wire grid layer 204. The metal wire grid structure 210 further includes a dielectric layer 203 stacked between the first metal wire grid layer 202 and the second metal wire grid layer 204.

The first metal wire grid layer 202 includes a plurality of metal wire strips 202a arranged in a first direction parallel to the substrate surface of the base substrate 201, and these metal wire strips 202a constitute a first metal wire grid. The second metal wire grid layer 204 includes a plurality of metal wire strips 204a arranged in the first direction parallel to the substrate surface of the base substrate 201, and these metal wire strips 204a constitute a second metal wire grid. The first metal wire grid layer 202 and the second metal wire grid layer 204 are stacked in a second direction perpendicular to the substrate surface of the base substrate 201.

For example, in at least one example, the base substrate 201 may be made of one or more material including, but not limited to, glass, PET, PVA, PI, polyacrylic acid, or a combination thereof. In addition, for the metal wire grid polarizer 200, the base substrate 201 may be provided independently or shared with other components, that is, a surface of other component is additionally used as the base substrate to form the metal wire grid structure 210.

In at least one example, the plurality of metal wire strips 202a of the first metal wire grid layer 202 and the plurality of metal wire strips 204a of the second metal wire grid layer 204 are respectively formed of metal or alloy. For example, the plurality of metal wire strips 202a and 204a may be formed of identical or different metals or alloys. For example, the plurality of metal wire strips 202a and 204a may be formed of aluminum, titanium, silver, gold, copper, or an alloy thereof, respectively. For example, the plurality of metal wire strips 202a and 204a may be formed of copper or aluminum.

For example, in the embodiment, the dielectric layer 203 covers the first metal wire grid layer 202 and serves as a planarization layer to form the second metal wire grid layer 204 thereon, whereby the first metal wire grid layer 202 and the second metal wire grid layer 204 have different distances to the base substrate. For example, the first metal wire grid layer 202 and the second metal wire grid layer 204 do not overlap each other in a direction parallel to the surface of the base substrate. In at least one example, substantially no dielectric layer is provided between the plurality of metal wire strips of the first metal wire grid layer 202.

FIG. 4B illustrates a schematically structural view of the dielectric layer 203 used in the wire grid polarizer as illustrated in FIG. 4A. As illustrated in FIG. 4B, the dielectric layer 203 sequentially includes a first dielectric layer 203a, a second dielectric layer 203b, a third dielectric layer 203c, and a fourth dielectric layer 203d in a direction away from the base substrate 201, in which the first dielectric layer 203a is disposed on the surface of the first metal wire grid layer 202, and the second metal wire grid layer 204 is disposed on the surface of the fourth dielectric layer 203d.

The first dielectric layer 203a is configured as a protective layer to protect the first metal wire grid layer 202, and the first dielectric layer 203a can be selected from an inorganic compound dielectric layer formed of silicon oxide or silicon nitride or an organic compound dielectric layer formed by thermal curing resin glue or light curing resin glue with a heat-resistant temperature greater than 100° C. For example, to reduce the effect on the transmittance, the first dielectric layer 203a may be formed of silicon oxide.

The second dielectric layer 203b is configured as a planarization layer to improve the surface flatness of the side of the first dielectric layer 203a near the second metal wire grid layer 204 and provide a flat surface for the preparation of the second metal wire grid layer 204. For example, the second dielectric layer 203b may be formed by thermal curing resin glue or light curing resin glue with a heat-resistant temperature greater than 100° C.;

The fourth dielectric layer 203d is configured as a protective layer. On the one hand, the fourth dielectric layer 203d protects the first metal wire grid layer 202. In addition, the fourth dielectric layer 203d serves as a base for forming the second metal wire grid layer 204 and is in direct contact with the second metal wire grid layer 204. Therefore, a relatively high etching selection ratio between the material of the fourth dielectric layer 203d and the material of the second metal wire grid layer 204 is required so as to prevent the surface of the dielectric layer 203 on a side near the second metal wire grid layer 204 from being destroyed when the second metal wire grid layer 204 is subsequently etched. For example, the fourth dielectric layer 203d may be formed of silicon oxide.

The third dielectric layer 203c is configured as a bonding promotion layer to improve adhesion between the second dielectric layer 203b and the fourth dielectric layer 203d and prevent the fourth dielectric layer 203d from peeling off from the second dielectric layer 203b during the preparation process, so as to ensure the stability of the polarizer 200. For example, the third dielectric layer 203c may be formed of silicon nitride.

In one example, a thickness of the first dielectric layer 203a may be 10~1000 nm, for example, about 100 nm. A thickness of the second dielectric layer 203b may be 200 nm~5000 nm, for example, about 1000 nm, about 2000 nm, about 3000 nm, or about 4000 nm. A thickness of the third dielectric layer 203c may be 50~1000 nm, for example, about 100 nm. A thickness of the fourth dielectric layer 203d may be 50~120 nm, for example, about 80 nm.

In the example of the embodiment as illustrated in FIG. 4A and FIG. 4B, the dielectric layer 203 is a composite dielectric layer including an inorganic compound dielectric layer and an organic compound dielectric layer. However, in some other examples of the embodiments of the present disclosure, for example, the dielectric layer 203 may be a single dielectric layer or a composite dielectric layer formed by stacking a plurality of dielectric sub-layers. For example, the plurality of dielectric sub-layers of the composite dielectric layer may be the same as each other or may be different from each other, and may be inorganic compound dielectric layers or organic compound dielectric layers, respectively. For example, the inorganic compound dielectric layers or the organic compound dielectric layers in the composite dielectric layer are alternately stacked. The inorganic compound dielectric layer may include silicon oxide, silicon nitride, silicon oxynitride, and etc. The organic compound dielectric layer may include resin material, for example, thermal curing resin glue or ultraviolet curing resin glue with a heat-resistant temperature higher than 100° C. The embodiments of the present disclosure are not limited thereto. In at least one example, a thickness of a single inorganic compound dielectric layer or an inorganic compound dielectric sub-layer in a composite dielectric layer may be 50~1000 nm, for example about 100 nm; a thickness of a single organic compound dielectric layer or an organic compound dielectric sub-layer in a composite dielectric layer may be 500~5000 nm, for example about 1000 nm, about 2000 nm, about 3000 nm, or about 4000 nm; and a total thickness of the composite dielectric layer may be 100 nm to 6000 nm.

For example, in the first metal wire grid layer 202 and the second metal wire grid layer 204 in the metal wire grid structure 210, the plurality of metal wire strips 202a or 204a may have identical or different wire grid periods, wire grid heights, and wire grid widths. For example, in the first metal wire grid layer 202 and the second metal wire grid layer 204, the period of the plurality of metal wire strips 202a or 204a may be respectively in a range of 40~200 nm, for example, 80~120 nm, or about 100 nm. For example, in the first metal wire grid layer 202 or the second metal wire grid layer 204, the height of the plurality of metal wire strips 202a or 204a may be respectively in a range of 160~300 nm, for example, 180~240 nm, and for example, about 200 nm. For example, in the first metal wire grid layer 202 or the second metal wire grid layer 204, the width of the plurality of metal wire strips 202a or 204a may be respectively in a range of 20~150 nm, for example, 30~80 nm, and for example, about 50 nm.

In the example of the embodiment as illustrated in FIG. 4A, the plurality of metal wire strips 202a in the first metal wire grid layer 202 and the plurality of metal wire strips 204a in the second metal wire grid layer 204 have the same wire grid period. For example, the plurality of metal wire strips 202a in the first metal wire grid layer 202 and the plurality of metal wire strips 204a in the second metal wire grid layer 204 may also have the same wire grid height. Furthermore, the plurality of metal wire strips 202a in the first metal wire grid layer 202 and the plurality of metal wire strips 204a in the second metal wire grid layer 204 may also have the same wire grid width.

However, in another example, one or more of the wire grid period, the wire grid height and the wire grid width of the plurality of metal wire strips 202a in the first metal wire grid layer 202 and the plurality of metal wire strips 204a in the second metal wire grid layer 204 may be identical or different.

In at least one example, in the metal wire grid structure 210, the plurality of metal wire strips 202a in the first metal wire grid layer 202 and the plurality of metal wire strips 204a in the second metal wire grid layer 204 are aligned with each other in the second direction perpendicular to the substrate surface of the base substrate 201. That is to say, the vertical projections of the plurality of metal wire strips 202a and the plurality of metal wire strips 204a on the substrate surface of the base substrate 201 are overlapped. For example, the plurality of metal wire strips 202a in the first metal wire grid layer 202 and the plurality of metal wire strips 204a in the second metal wire grid layer 104 have the same wire grid period. If the widths of the plurality of metal wire strips 202a and the plurality of metal wire strips 204a are equal to each other, their vertical projections on the substrate surface of the base substrate 201 completely overlap and correspond to each other; or if the widths of the plurality of metal wire strips 202a and the plurality of metal wire strips 204a are not equal to each other, for example, if the width of the metal wire strips 202a is smaller than the width of the metal wire strips 204a, then the vertical projections of the metal wire strips 202a on the substrate surface of the base substrate 201 are respectively within the vertical projections of the metal wire strips 204a on the substrate surface of the base substrate 201. In another example, the plurality of metal wire strips 202a in the first metal wire grid layer 202 and the plurality of metal wire strips 204a in the second metal wire grid layer 204 are complementary in the second direction perpendicular to the substrate surface of the base substrate 201, which refers to that the vertical projections of the plurality of metal wire strips 202a and the vertical projections of the plurality of metal wire strips 204a on the substrate surface of the base substrate 201 do not overlap, and for example, their projections are further put together to cover the entire substrate surface of the base substrate 201. In yet another example, the plurality of metal wire strips 202a in the first metal wire grid layer 202 and the plurality of metal wire strips 204a in the second metal wire grid layer 204 are partially aligned in the second direction perpendicular to the substrate surface of the base substrate 201. That is to say, the vertical projections of the plurality of metal wire strips 202a and the vertical projections of the plurality of metal wire strips 204a on the substrate surface of the base substrate 201 partially overlap and do not cover the entire substrate surface of the base substrate 201. The embodiments of the present disclosure do not limit this.

The metal wire grid structure 210 adopting a stacked design significantly improves the polarization efficiency of the polarizer 200. Table 1 below shows transmittance and polarization efficiency of the polarizer 200 when the plurality of metal wire strips 202a in the first metal wire grid layer 202 and the plurality of metal wire strips 204a in the second metal wire grid layer 204 are respectively in overlapping, complementary, or semi-overlapping positions.

TABLE 1

The effect of the relative positions of the metal wire grids in each layer of the stacking-layer wire grid polarizer on the performance of the polarizer

| | transmittance | polarization efficiency |
|---|---|---|
| single-layered wire grid polarizer | | |
| single-layered metal wire grid polarizer | 39.42% | 99.95525891% |
| double-layered stacking wire grid polarizer in which the plurality of metal wire strips in the first metal wire grid layer and the plurality of metal wire strips in the second metal wire grid layer have the following relative positional relationships, respectively | | |
| overlapping | 33.91% | 99.99978032% |
| complementary | 34.82% | 99.99973293% |
| semi-overlapping | 34.90% | 99.99980734% |

The results in the above Table 1 show that when the plurality of metal wire strips 202a in the first metal wire grid layer 202 and the plurality of metal wire strips 204a in the second metal wire grid layer 204 are arranged such that the wire grids are in overlapping, complementary, and semi-overlapping relative positional relationships, the polarization efficiencies of the polarizer 200 are similar, that is, all can reach an excellent polarization efficiency of more than 99.999%. It can be seen that the relative positional relationships between the plurality of metal wire strips 202a and the plurality of metal wire strips 204a have no significant effect on the polarization efficiency. In addition, when the plurality of metal wire strips 202a in the first metal wire grid layer 202 and the plurality of metal wire strips 204a in the second metal wire grid layer 204 are in a relative positional relationship that the positions of the wire grids are half-overlapped, the transmittance of the polarizer 200 is slightly higher than the transmittance obtained when the plurality of metal wire strips 202a and the plurality of metal wire strips 204a are in a positional relationship of overlapping or complementary.

As illustrated in FIG. 4A, the polarizer 200 provided by at least one embodiment of the present disclosure may further include a protective layer 205 on a side of the metal wire grid structure 210 away from the base substrate. The protective layer 205 covers the second metal wire grid layer 204 to protect the wire grids of the metal wire grid structure 210, for example, to prevent the wire grids of the second metal wire grid layer 204 from being damaged due to friction. The protective layer 205 may be a single protective layer or a composite protective layer formed by stacking a plurality of protective sub-layers. For example, the plurality of protective sub-layers of the composite protective layer may be the same or different from each other, and may be an inorganic compound protective layer or an organic compound protective layer, respectively. For example, the inorganic compound protective layers or the organic compound protective layer in the composite protective layers are alternately stacked. For example, the material of the protective layer 205 may be an inorganic material, such as silicon oxide, silicon nitride, silicon oxynitride, and etc., or may be an organic material, such as resin material with a heat-resistant temperature higher than 100° C. For example, the thickness of the protective layer 205 may be in a range from 10 nm to 500 nm.

For example, in at least one example, substantially no protective layer 205 is formed between the plurality of metal wire strips of the second metal wire grid layer 204.

The embodiment as illustrated in FIG. 4A includes two metal wire grid layers, namely, the first metal wire grid layer 102 and the second metal wire grid layer 104, but other embodiments of the present disclosure may include more metal wire grid layers. For example, a polarizer provided by another embodiment of the present disclosure includes three metal wire grid layers. A polarizer provided by another embodiment of the present disclosure includes four metal wire grid layers. In other embodiments of the present disclosure, more than four metal wire grid layers may be included.

The embodiment as illustrated in FIG. 4A forms a stacked wire grid polarizer by using two metal wire grid layers with relatively low wire grid heights. Although a total height of the metal wire grid layers in the metal wire grid polarizer is increased, the falling-over phenomenon of the metal wire grid due to too high height of the metal wire grid is avoided, and thereby facilitating to achieve a polarization efficiency higher than 99.99%.

Figure 5:
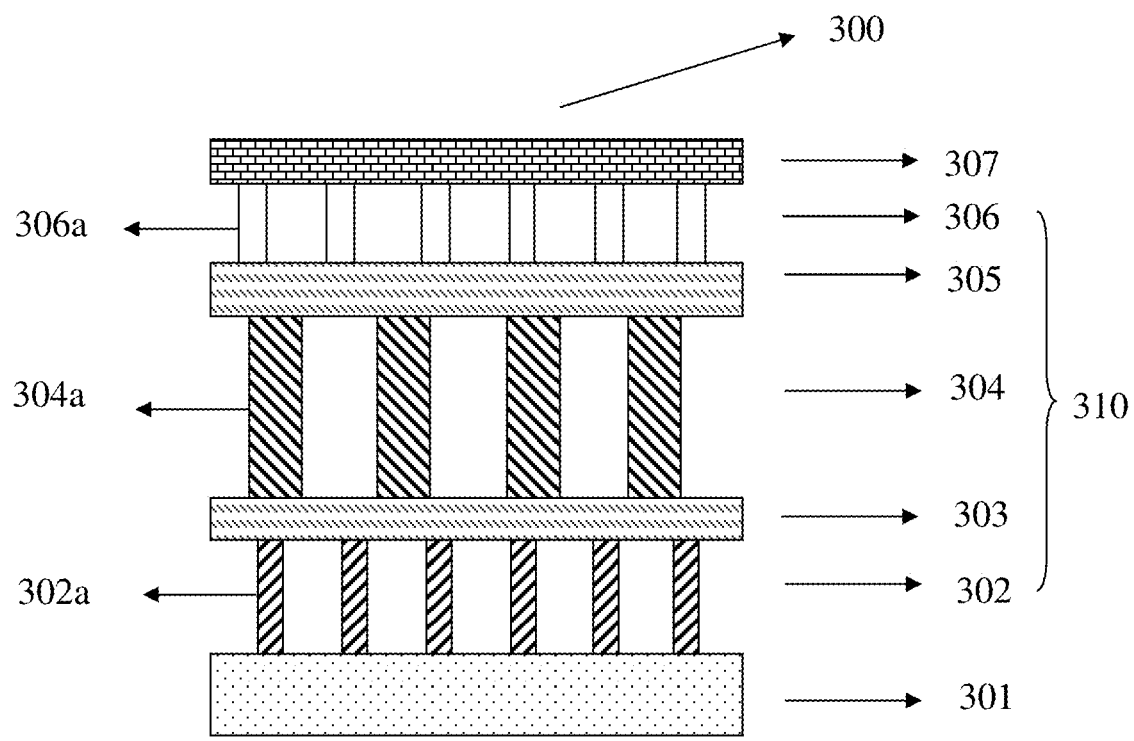
FIG. 5 is a schematically structural view of another wire grid polarizer provided by another embodiment of the present disclosure.

FIG. 5 illustrates another polarizer 300 according to another embodiment of the present disclosure. The polarizer 300 includes a base substrate 301 and a metal wire grid structure 310 provided on the base substrate 301, in which the metal wire grid structure 310 includes three metal wire grid layers, namely, a first metal wire grid layer 302, a second metal wire grid layer 304, and a third metal wire grid layer 306. The metal wire grid structure 310 further includes a first dielectric layer 303 stacked between the first metal wire grid layer 302 and the second metal wire grid layer 304, and a second dielectric layer 305 stacked between the second metal wire grid layer 303 and the third metal wire grid layer 306.

The first metal wire grid layer 302, the second metal wire grid layer 304, and the third metal wire grid layer 306 include a plurality of metal wire strips 302a, 304a, and 306a arranged in a first direction parallel to the substrate surface of the base substrate 201, respectively, and the first metal wire grid layer 302, the second metal wire grid layer 304, and the third metal wire grid layer 306 are stacked in a second direction perpendicular to the substrate surface of the base substrate 201.

For example, in at least one example, the base substrate 301 may be made of one or more material including, but not limited to, glass, PET, PVA, PI, polyacrylic acid, or a combination thereof.

In at least one example, the plurality of metal wire strips 302a, 304a, and 306a are respectively formed of metal or alloy. For example, the plurality of metal wire strips 302a, 304a, and 306a may be formed of identical or different metals or alloys. For example, the plurality of metal wire strips 302a, 304a, and 306a may be formed of aluminum, titanium, silver, gold, copper, or an alloy thereof, respectively. For example, the plurality of metal wire strips 302a, 304a, and 306a may be formed of copper or aluminum.

For example, in the embodiment, the first dielectric layer 303 covers the first metal wire grid layer 302 and serves as a planarization layer to form the second metal wire grid layer 304 thereon. The second dielectric layer 305 covers the second metal wire grid layer 304 and serves as a planarization layer to form the third metal wire grid layer 306 thereon. The first dielectric layer 303 and the second dielectric layer 305 may be a single dielectric layer or a composite dielectric layer formed by stacking a plurality of dielectric sub-layers, respectively. For example, the plurality of dielectric sub-layers of the composite dielectric layer may be the same as each other or may be different from each other, and may be inorganic compound dielectric layers or organic compound dielectric layers, respectively. For example, the inorganic compound dielectric layers or the organic compound dielectric layers in the composite dielectric layer are alternately stacked. The inorganic compound dielectric layer may include silicon oxide, silicon nitride, silicon oxynitride, and etc. The organic compound dielectric layer may include resin material, such as thermal curing resin glue or ultra-violet curing resin glue with a heat-resistant temperature higher than 100° C.

In at least one example, substantially no dielectric layer 303 or 305 is formed between the plurality of metal wire strips of the first metal wire grid layer 302 and the second metal wire grid layer 304.

For example, in the first metal wire grid layer 302, the second metal wire grid layer 304, and the third metal wire grid layer 306 in the metal wire grid structure 310, the plurality of metal wire strips 302a, 304a, or 306a may have identical or different wire grid periods, wire grid heights, and wire grid widths. For example, in the first metal wire grid layer 302, the second metal wire grid layer 304, and the third metal wire grid layer 306, the period of the plurality of metal wire strips 302a, 304a, or 306a may be respectively in a range of 40~200 nm, for example, 80~120 nm, or for example 100 nm. For example, in the first metal wire grid layer 302, the second metal wire grid layer 304, and the third metal wire grid layer 306, the height of the plurality of metal wire strips 302a, 304a, or 306a may be in a range of 160~300 nm, for example, 180 nm to 240 nm, and for example 200 nm. For example, in the first metal wire grid layer 302, the second metal wire grid layer 304, and the third metal wire grid layer 306, the width of the plurality of metal wire strips 302a, 304a, or 306a may be in a range of 20~150 nm, for example 30~80 nm, and for example 50 nm.

In the example of the embodiment as illustrated in FIG. 5A, the plurality of metal wire strips 302a, 304a or 306a in the first metal wire grid layer 302, the second metal wire grid layer 304, and the third metal wire grid layer 306 have different wire grid periods. For example, the plurality of metal wire strips 302a, 304a, or 306a in the first metal wire grid layer 302, the second metal wire grid layer 304, and the third metal wire grid layer 306 may also have different wire grid heights. Furthermore, the plurality of metal wire strips 302a, 304a, or 306a in the first metal wire grid layer 302, the second metal wire grid layer 304, and the third metal wire grid layer 306 may also have different wire grid widths.

However, in another example, one or more of the wire grid period, the wire grid height, and the wire grid width of the plurality of metal wire strips 302a, 304a, or 306a in the first metal wire grid layer 302, the second metal wire grid layer 304, and the third metal wire grid layer 306 may be respectively identical or different.

For example, in the metal wire grid structure 310, any two of the plurality of metal wire strips 302a, 304a, and 306a in the first metal wire grid layer 302, the second metal wire grid layer 304, and the third metal wire grid layer 306 are aligned with each other in the second direction perpendicular to the substrate surface of the base substrate 301. In another example, any two of the plurality of metal wire strips 302a, 304a, and 306a in the first metal wire grid layer 302, the second metal wire grid layer 304, and the third metal wire grid layer 306 are not aligned with each other in the second direction perpendicular to the substrate surface of the base substrate 301.

As illustrated in FIG. 5, the polarizer 300 provided by at least one embodiment of the present disclosure may further include a protective layer 307 on a side of the metal wire grid structure 310 away from the base substrate. The protective layer 307 is provided to protect the wire grids of the metal wire grid structure 310, for example, to prevent the wire grids of the third metal wire grid layer 306 from being damaged due to friction. The material of the protective layer 307 may be inorganic material, such as silicon oxide, silicon nitride, silicon oxynitride, or may be organic material, such as resin material. For example, the thickness of the protective layer 307 may be in a range from 10 nm to 500 nm.

For example, in at least one example, substantially no protective layer 307 is formed between the plurality of metal wire strips of the third metal wire grid layer 306.

The embodiment as illustrated in FIG. 5 forms a stacking-layer wire grid polarizer by using three metal wire grid layers with relatively low wire grid heights. Although the total height of the metal wire grid layers in the metal wire grid polarizer is increased, the wire grid falling-over phenomenon due to too high height of the metal wire grid is avoided, and thereby facilitating to achieve a polarization efficiency higher than 99.99%.

Figure 6:
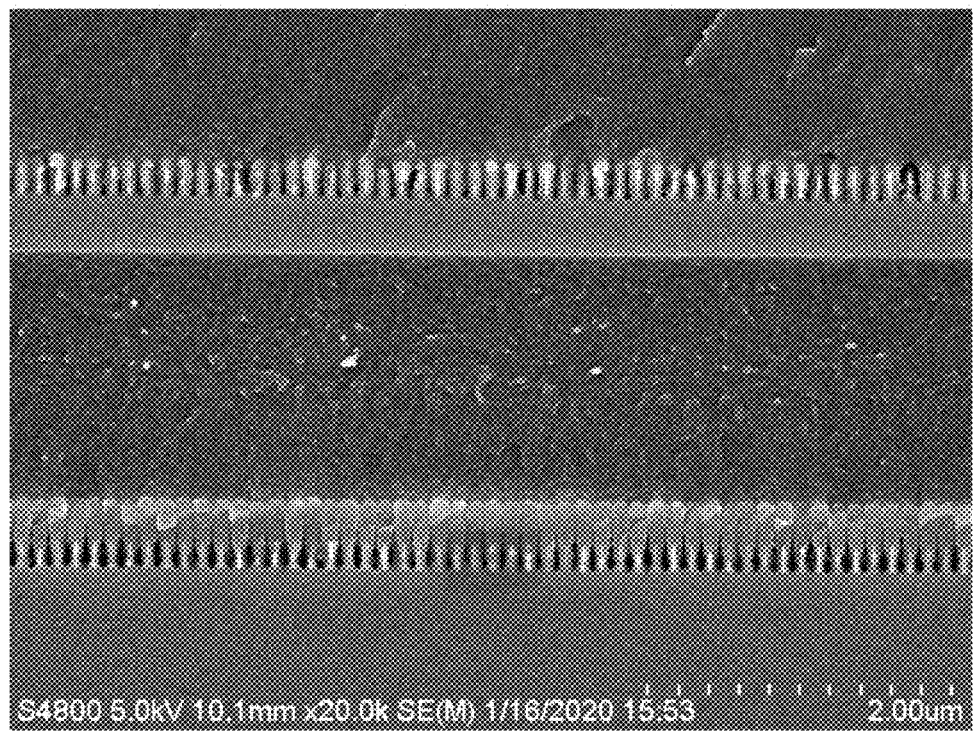
FIG. 6 is a micrograph of a wire grid polarizer provided by an embodiment of the present disclosure.

FIG. 6 illustrates an electron microscope (SEM) photograph of a metal wire grid polarizer according to an embodiment of the present disclosure. As illustrated in FIG. 6, a first metal wire grid layer, a dielectric layer, a second metal wire grid layer, and a protective layer are sequentially formed on the base substrate, which corresponds to an example of the embodiment as illustrated in FIG. 4A, for example. In the embodiment as illustrated in FIG. 6, the first metal wire grid layer and the second metal wire grid layer have different wire grid heights, and an overall height is higher than the metal wire grid polarizer as illustrated in FIG. 3, for example. However, no wire grid falling-over phenomenon occurs in either the first metal wire grid layer or the second metal wire grid layer, and thus the problem of deterioration of the polarization efficiency of the polarizer will not be presented. Moreover, as illustrated in the SEM photograph of FIG. 6, substantially no dielectric layer is formed between the metal wire strips of the first metal wire grid layer, and substantially no protective layer is formed between the metal wire strips of the second metal wire grid layer.

At least one embodiment of the present disclosure also provides a method of preparing a polarizer, which is used for preparing any one of the metal wire grid polarizers. The method includes: providing a base substrate; and forming a metal wire grid structure on the base substrate. The metal wire grid structure includes a plurality of metal wire grid layers and a dielectric layer between adjacent metal wire grid layers of the plurality of metal wire grid layers. Each of the plurality of metal wire grid layers includes a plurality of metal wire strips arranged in a grid pitch in a first direction parallel to the substrate surface of the base substrate, and the plurality of metal wire grid layers are stacked in a second direction perpendicular to the substrate surface of the base substrate.

Figure 7:
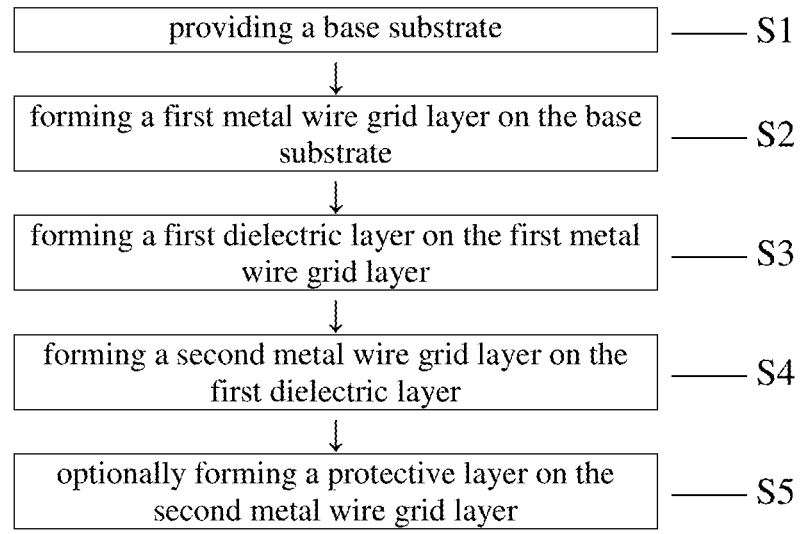
FIG. 7 is a schematic flowchart of an exemplary method of preparing a polarizer provided by an embodiment of the present disclosure.

FIG. 7 illustrates a schematic flow chart of a method of forming the wire grid polarizer according to at least one embodiment of the present disclosure, for example. The method includes the following steps:

Step S1: providing a base substrate;

Step S2: forming a first metal wire grid layer on the base substrate;

Step S3: forming a dielectric layer on the first metal wire grid layer;

Step S4: forming a second metal wire grid layer on the dielectric layer;

Step S5: forming a protective layer on the second metal wire grid layer.

For example, in at least one example, forming a metal wire grid structure on a base substrate includes alternately forming a plurality of metal wire grid layers and one or more dielectric layers located between adjacent metal wire grid layers on the base substrate, the plurality of metal wire grid layers and one or more dielectric layers are included by the metal wire grid structure.

In the above method, the first metal wire grid layer 202, the dielectric layer 203, and the second metal wire grid layer 204 are sequentially formed on the base substrate 201. For example, the material forming the first metal wire grid layer 202 and the second metal wire grid layer 204 may be aluminum, titanium, silver, gold, copper, or an alloy thereof.

For example, a method of forming each of the first metal wire grid layer 202 and the second metal wire grid layer 204 includes using a patterning process to form a plurality of metal wire strips parallel to each other in the wire grid layers. The patterning process includes photolithography, imprinting, and etc.

For example, an example of the imprinting process includes: forming a metal thin film with a thickness of 160~240 nm on a substrate; forming a hard mask layer with a thickness of 80~120 nm on the metal thin film; and applying imprinting glue on the so-formed hard mask layer, imprinting, and curing to obtain a grating structure; and finally, obtaining a metal wire grid structure by a dry etching process. In this process, the metal thin film formed on the substrate may be an aluminum thin film with a thickness of about 200 nm; and the hard mask layer may be a SiO layer with a thickness of about 100 nm.

For example, the dielectric layer 203 may be a single dielectric layer or a composite layer formed by stacking a plurality of dielectric sub-layers. For example, the plurality of dielectric sub-layers of the composite layer may be inorganic compound dielectric layers or organic compound dielectric layers. For example, the inorganic compound dielectric layers or the organic compound dielectric layers in the composite layer are alternately stacked. The process of forming the dielectric layer 203 can be selected according to the material or structure thereof. For example, the inorganic compound dielectric layers or the inorganic compound dielectric sub-layers are formed by chemical vapor deposition, or the organic compound dielectric layers or the organic compound dielectric sub-layers are formed by spin coating or blade coating.

In at least one example, the dielectric layer 203 is formed so that substantially no dielectric layer part enters between the metal wire grids of the first metal wire grid layer.

For example, the material of the protective layer 205 may be inorganic material, such as silicon oxide, silicon nitride, silicon oxynitride, and etc., or may be organic material, such as resin material. For example, the protective layer 105 may be formed by a chemical vapor deposition process.

In at least one example, the protective layer 105 is formed so that substantially no protective layer part enters between the metal wire grids of the second metal wire grid layer.

The above method corresponds to the embodiment as illustrated in FIG. 4A, in which two metal wire grid layers are formed, but other embodiments of the present disclosure may include more metal wire grid layers and thus more metal wire grid layers need to be formed.

Correspondingly, as for the method described above, Steps S3 and S4 can be repeated one or more times as needed before Step S5 to form a metal wire grid structure including more metal wire grid layers and more dielectric layers, for example, to form the metal wire grid structure as illustrated in FIG. 5 which includes the first metal wire grid layer 302, the first dielectric layer 303, the second metal wire grid layer 304, the second dielectric layer 305, and the third metal wire grid layer 306. Then, a protective layer is formed on the thus-obtained metal wire grid structure.

At least one embodiment of the present disclosure also provides an electronic device including any of the polarizers. For example, one embodiment of the electronic device provided by at least one embodiment of the present disclosure is a display panel, such as a liquid crystal display panel, such as a single-cell type liquid crystal panel, or a double-cell type liquid crystal display panel.

The following description is made by using a double-cell type liquid crystal display panel as an example, but the embodiments of the present disclosure are not limited thereto.

Figure 8:
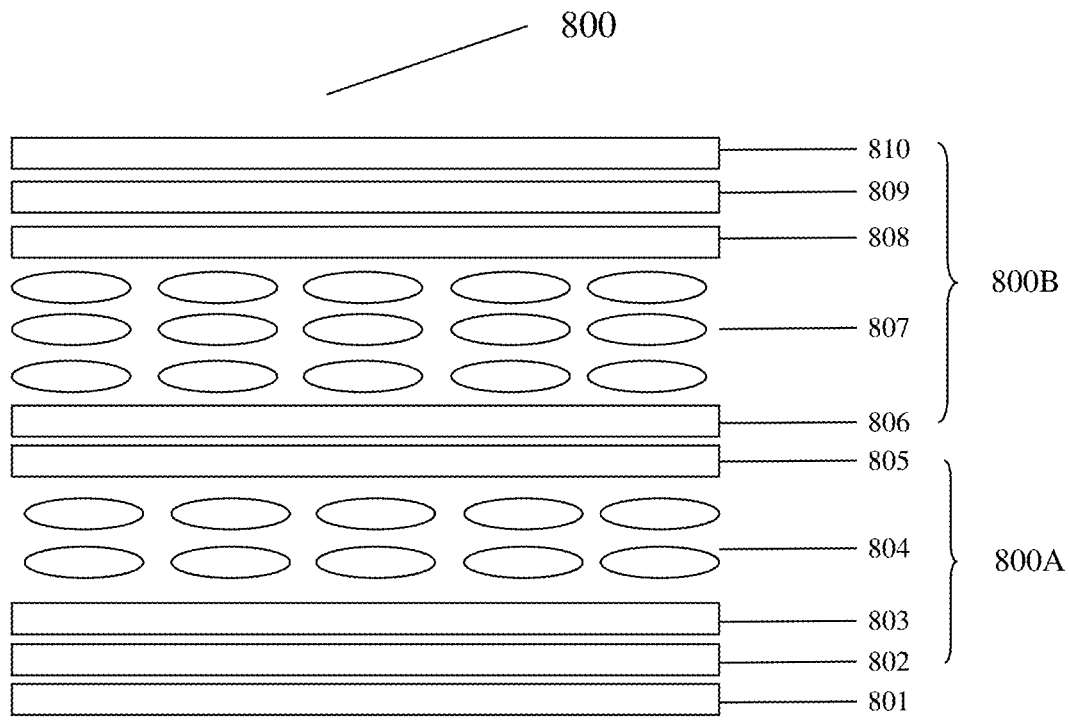
FIG. 8 is a schematically structural view of a cross-section of a liquid crystal display panel including a polarizer provided by an embodiment of the present disclosure.

FIG. 8 is a schematically structural view of a cross-section of a double-cell type liquid crystal display panel 800 provided by an embodiment of the present disclosure. As illustrated in FIG. 8, the liquid crystal display panel 800 includes a lower liquid crystal panel 800A and an upper liquid crystal panel 800B which are stacked. Specifically, the liquid crystal display panel 800 sequentially includes a lower polarizer 802, a lower array substrate 803, a lower liquid crystal layer 804, a metal wire grid polarizer (stacked polarizer) 805, an upper array substrate 806, an upper liquid crystal layer 807, a color filter 808, an upper opposite substrate 809, and an upper polarizer 810 in a direction away from a backlight source 801. The metal wire grid polarizer 805 is the metal wire grid polarizer according to any one of the embodiments of the present disclosure as described above.

In this embodiment, the lower liquid crystal panel 800A includes the lower polarizer 802, the lower array substrate 803, the lower liquid crystal layer 804, and the metal wire grid polarizer 805; and the upper liquid crystal panel 800B includes the upper array substrate 806, the upper liquid crystal layer 807, the color filter 808, the upper opposite substrate 809, and the upper polarizer 810. Here, the upper array substrate 806 is shared by the two liquid crystal panels, and the upper array substrate 806 and the lower array substrate 803 constitute a liquid crystal cell. In another example, an opposite substrate (not shown) may also be provided for the lower liquid crystal panel. The opposite substrate is located on a side of the upper array substrate 806 near the backlight source 801 and forms a liquid crystal cell together with the lower array substrate 803.

In this embodiment, the lower liquid crystal panel 800A is used as a dimming screen, and the upper liquid crystal panel 800B is used as a display screen, so that they collectively realize the display function. The dimming screen is on the backlight side of the display screen and is used for modulating the backlight for the display screen.

In at least one example, the lower liquid crystal panel 800A is, for example, a horizontal electric field type, in particular, for example, an in-plane switching (IPS) type or a fringe electric field switch (FFS) type; and the upper liquid crystal panel 800B is, for example, a vertical electric field type, or a horizontal electric field type, etc. The lower array substrate 803 and the upper array substrate 806 respectively include a pixel array. The pixel array includes a plurality of pixel units, a plurality of gate lines, and a plurality of data lines arranged in a matrix. The gate lines and the data lines cross each other to define a plurality of pixel regions for the pixel units. Each pixel unit includes a pixel circuit including a switching element (for example, a thin film transistor) and a pixel electrode, etc., and may also include a common electrode (for example, horizontal electric field type) as required, and the common electrode cooperates with the pixel electrode to drive liquid crystal molecules.

In the example of the embodiment in the figure, the color filter 808 is located on a side of the upper opposite substrate 809 near the backlight source 801. However, in other examples, the color filter may be provided on a side of the upper opposite substrate 809 away from the backlight source 801. Moreover, when the upper liquid crystal panel is the vertical electric field type, a common electrode layer may be provided on a side of the upper opposite substrate (for example, a side near the backlight source 801).

The lower polarizer 802 and the upper polarizer 810 are, for example, organic polarizers, and have the same polarization direction which is perpendicular to the polarization direction of the metal wire grid polarizer 805.

In the example of the embodiment as illustrated in the figure, the metal wire grid polarizer 805 is provided on a side of the upper array substrate 806 near the backlight source 801. For example, the metal wire grid polarizer 805 is bonded to a surface of the upper array substrate 806 on the side near the backlight source 801. Or, the metal wire grid polarizer 805 and the upper array substrate 806 share part of the structure. For example, the metal wire grid polarizer 805 uses a surface of the upper array substrate 806 on a side near the backlight source 801 as a base substrate thereof, that is, the metal wire grid structure of the metal wire grid polarizer 805 is directly prepared on the surface of the upper array substrate 806 on the side near the backlight source 801. In an example of providing an opposite substrate for the lower liquid crystal panel, the metal wire grid polarizer 805 can be disposed on a side of the opposite substrate near the backlight source 801, or can be disposed between the opposite substrate and the upper array substrate 806 (namely, on a side of the upper array substrate 806 near the backlight source 801).

The double-cell type liquid crystal display panel 800 of this embodiment using the metal wire grid polarizer 805, compared with that using a polarizer based on organic materials, using the metal wire grid polarizer can obtain better polarization characteristics, and the overall thickness of the double-cell type liquid crystal display panel is also decreased, which help achieving a smaller profile. In addition, in at least one variation of the present embodiment, at least one of the lower polarizer 802 and the upper polarizer 810 is replaced by the metal wire grid polarizer, and can be formed by using other substrate (lower array substrate or upper array substrate) as a base substrate, so that a smaller profile can be achieved.

Figure 9:
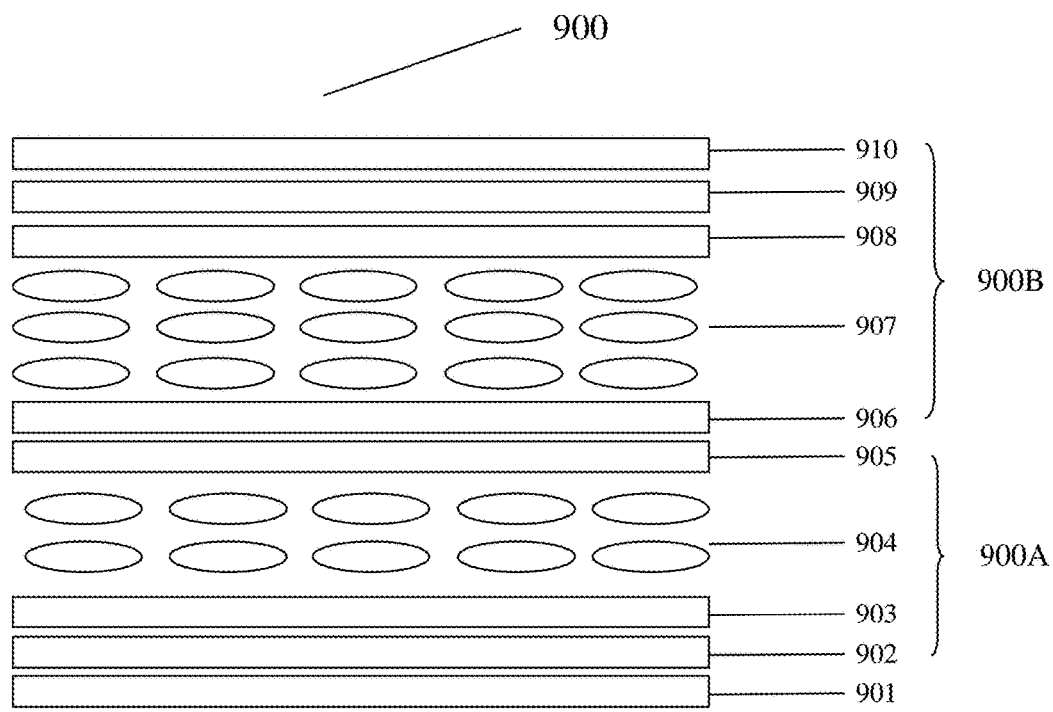
FIG. 9 is a schematically structural view of a cross-section of another liquid crystal display panel including a polarizer provided by another embodiment of the present disclosure.

FIG. 9 illustrates a schematically structural view of a cross-section of a double-cell type liquid crystal display panel 900 provided by another embodiment of the present disclosure. As illustrated in this figure, the liquid crystal display panel 900 includes a lower liquid crystal panel 900A and an upper liquid crystal panel 900B which are stacked. Specifically, the liquid crystal display panel 900 sequentially includes a lower polarizer 902, a lower array substrate 903, a lower liquid crystal layer 904, an upper array substrate 905, a metal wire grid polarizer (stacking-layer polarizer) 906, an upper liquid crystal layer 907, a color filter 908, an upper opposite substrate 909, and an upper polarizer 910 in a direction away from a backlight source 901. The metal wire grid polarizer 905 is the metal wire grid polarizer according to any one of the embodiments of the present disclosure as described above. The embodiment as illustrated in FIG. 9 is different from the embodiment as illustrated in FIG. 8 in that the metal wire grid polarizer 906 is disposed on a side of the upper array substrate 905 away from the backlight source 901.

In this embodiment, the lower liquid crystal panel 900A includes the lower polarizer 902, the lower array substrate 903, the lower liquid crystal layer 904; and the upper liquid crystal panel 900B includes the upper array substrate 905, the metal wire grid polarizer 906, the upper liquid crystal layer 907, the color filter 908, the upper opposite substrate 909, and the upper polarizer 910. Here, the upper array substrate 905 is shared by two liquid crystal panels, and the upper array substrate 905 and the lower array substrate 903 constitute a liquid crystal cell. In another example, an opposite substrate may also be provided for the lower liquid crystal panel. The opposite substrate is located on a side of the upper array substrate 905 near the backlight source 901 and forms a liquid crystal cell together with the lower array substrate 903.

In this embodiment, similarly, the lower liquid crystal panel 900A is used as a dimming screen, and the upper liquid crystal panel 900B is used as a display screen, and they collectively realize the display function. The dimming screen is on the backlight side of the display screen and is used for modulating the backlight for the display screen.

In the example of the embodiment as illustrated in the figure, the metal wire grid polarizer 906 uses a surface of the upper array substrate 905 on a side away from the backlight source 901 as a base substrate thereof, that is, the metal wire grid structure of the metal wire grid polarizer 906 is directly prepared on the surface of the upper array substrate 905 on a side away from the backlight source 901. The other structures in this embodiment are similar to the embodiment as illustrated in FIG. 8, and description about the other structures is not repeated here.

The double-cell type liquid crystal display panel 900 of this embodiment using the metal wire grid polarizer 906, compared with that using a polarizer based on organic materials, using the metal wire grid polarizer can obtain better polarization characteristics, the overall thickness of the double-cell type liquid crystal display panel is also decreased, which helps achieving a smaller profile.

In at least one variation of the present embodiment, at least one of the lower polarizer 902 and the upper polarizer 910 is replaced by the metal wire grid polarizer, which can help achieve a smaller profile. In addition, in at least one variation of the present embodiment, at least one of the lower polarizer 902 and the upper polarizer 910 is replaced by the metal wire grid polarizer, and can be formed by using other substrate (lower array substrate or upper array substrate) as a base substrate, so that a smaller profile can be achieved.

Figure 10:
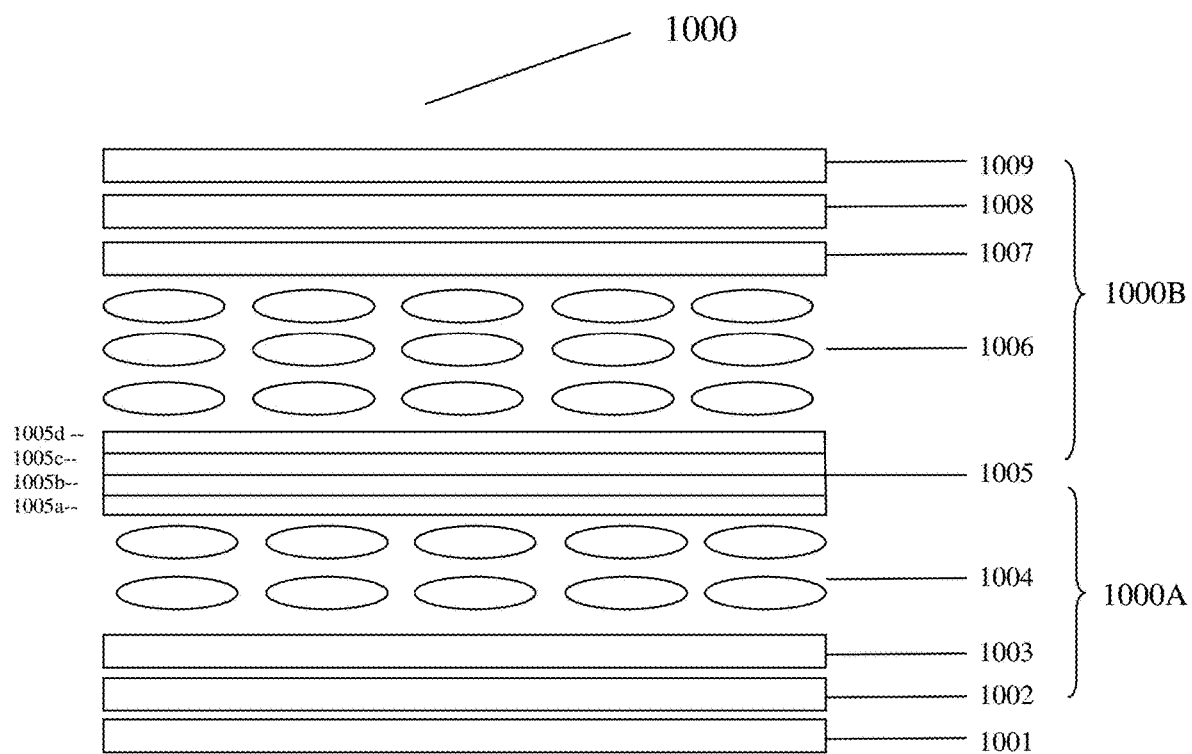
FIG. 10 is a schematically structural view of another liquid crystal display panel including a polarizer provided by another embodiment of the present disclosure.

FIG. 10 illustrates a schematically structural view of a cross-section of a double-cell type liquid crystal display panel 1000 provided by another embodiment of the present disclosure. As illustrated in this figure, the liquid crystal display panel 1000 includes a lower liquid crystal panel 1000A and an upper liquid crystal panel 1000B which are stacked. Specifically, the liquid crystal display panel 1000 sequentially includes a lower polarizer 1002, a lower array substrate 1003, a lower liquid crystal layer 1004, a metal wire grid polarizer (stacking-layer polarizer) 1005, an upper liquid crystal layer 1006, a color filter 1007, an upper opposite substrate 1008, and an upper polarizer 1009 in a direction away from a backlight source 1001, in which the metal wire grid polarizer 1005 is used as a part of both the lower liquid crystal panel 1000A and the upper liquid crystal panel 1000B at the same time. The metal wire grid polarizer 1005 is a metal wire grid polarizer according to an embodiment of the present disclosure, and sequentially includes a base substrate 1005a, a first metal wire grid layer 1005b, a dielectric layer 1005c, and a second metal wire grid layer 1005d, in which the dielectric layer 1005c is also used as the base substrate of the upper array substrate, and other functional film layers of the upper array substrate are further formed on a side of each of the first metal wire grid layer 1005b and the second metal wire grid layer 1005d away from the base substrate. The embodiment as illustrated in FIG. 10 is different from the embodiments as illustrated in FIG. 8 and FIG. 9 in that the dielectric layer 1005c of the metal wire grid polarizer 1005 is also used as the base substrate of the upper array substrate, and other functional film layers of the upper array substrate are further formed on a side of each of the first metal wire grid layer 1005b and the second metal wire grid layer 1005d away from the base substrate.

In this embodiment, the lower liquid crystal panel 1000A includes the lower polarizer 1002, the lower array substrate 1003, the lower liquid crystal layer 1004, and the metal wire grid polarizer 1005; and the upper liquid crystal panel 1000B includes the metal wire grid polarizer 1005, the upper liquid crystal layer 1006, the color filter 1007, the upper opposite substrate 1008, and the upper polarizer 1009. The metal wire grid polarizer 1005 is used as a part of both the lower liquid crystal panel 1000A and the upper liquid crystal panel 1000B at the same time.

Likewise, in this embodiment, the lower liquid crystal panel 1000A is used as a dimming screen, and the upper liquid crystal panel 1000B is used as a display screen, and they collectively realize the display function. The dimming screen is on the backlight side of the display screen and is used for modulating the backlight for the display screen.

Here, the dielectric layer 1005*c* is also used as the base substrate of the upper array substrate, and other functional film layers of the upper array substrate are further formed on a side of each of the first metal wire grid layer 1005*b* and the second metal wire grid layer 1005*d* away from the base substrate, and the metal wire grid polarizer 1005 is used as a part of both the lower liquid crystal panel 1000A and the upper liquid crystal panel 1000B at the same time. The other structures in this embodiment are similar to the embodiment as illustrated in FIG. 8, and description about the other structures is not repeated here.

The double-cell type liquid crystal display panel 1000 of this embodiment using the metal wire grid polarizer 1005, compared with that using a polarizer based on organic materials, using the metal wire grid polarizer can obtain better polarization characteristics, and the overall thickness of the double-cell type liquid crystal display panel is also decreased, which helps achieving a smaller profile.

In addition, in at least one variation of the present embodiment, at least one of the lower polarizer 1002 and the upper polarizer 1009 is replaced by the metal wire grid polarizer, and can be formed by using other substrate (lower array substrate or upper opposite substrate) as a base substrate, so that a smaller profile can be achieved.

In the metal wire grid polarizer and the preparing method thereof provided by at least one embodiment of the present disclosure, by stacking a plurality of metal wire grid layers with dielectric layers as interlayers to form a novel metal wire grid structure, a problem of grating falling-over after a metal grating height exceeds a certain range is avoided. In this way, a polarizer with high polarization characteristics is obtained, which can be used in a double-cell type liquid crystal display device that requires high contrast.

The following points should be noted:

1) The accompanying drawings involve only the structure(s) in connection with the embodiment(s) of the present disclosure, and other structure(s) can be referred to common design(s).
2) For the sake of clarity, in the drawings used to describe the embodiments of the present disclosure, the thicknesses of layers or regions are enlarged or reduced, that is, these drawings are not drawn according to actual scale. It can be understood that when an element, such as a layer, a film, a region, or a substrate, is referred to as being "on" or "under" another element, the element can be "directly" on or "under" the other element, or there may be an intermediate element.
3) Without conflicting with each other, features in one embodiment or in different embodiments can be combined to obtain new embodiment(s).

The described above is only the exemplary embodiments of the present disclosure, and the scope of the present disclosure is not limited thereto. The scope of the present disclosure should be defined by the claims.

What is claimed is:

1. A polarizer, comprising:
    a base substrate, and
    a metal wire grid structure provided on the base substrate, wherein the metal wire grid structure comprises:
    a plurality of metal wire grid layers, wherein each of the plurality of metal wire grid layers comprises a plurality of metal wire strips arranged periodically in a first direction parallel to a surface of the base substrate, and each of the plurality of metal wire grid layers is stacked in a second direction perpendicular to the surface of the base substrate, wherein orthographic projections of the plurality of metal wire strips of a first metal wire grid layer on the base substrate and orthographic projections of the plurality of metal wire strips of a second metal wire grid layer on the base substrate are overlapped with each other one by one, or orthographic projections of the plurality of metal wire strips of the first metal wire grid layer on the base substrate and orthographic projections of the plurality of metal wire strips of the second metal wire grid layer on the base substrate are complementary with each other; and
    a plurality of dielectric layers stacked between adjacent metal wire grid layers each with the plurality of metal wire strips,
    wherein
    the plurality of dielectric layers are selected from a group consisting of an inorganic compound dielectric layer, an organic compound dielectric layer, and a combination thereof, and the inorganic compound dielectric layer has an inorganic compound selected from a group consisting of silicon oxide, silicon nitride, silicon oxynitride, and a mixture thereof, and the organic compound dielectric layer has an organic compound which is thermal curing resin glue or light curing resin glue with a heat-resistant temperature greater than 100° C., and
    the plurality of dielectric layers sequentially comprises, in a direction away from the base substrate:
    a first dielectric layer configured as a protective layer, wherein the first dielectric layer is an inorganic compound dielectric layer formed of silicon oxide or silicon nitride, or an organic compound dielectric layer formed by thermal curing resin glue or light curing resin glue with a heat-resistant temperature greater than 100° C.;
    a second dielectric layer configured as a planarization layer, wherein the second dielectric layer is formed by thermal curing resin glue or light curing resin glue with a heat-resistant temperature greater than 100° C.;
    a third dielectric layer configured as a bonding promotion layer, wherein the third dielectric layer is formed of silicon nitride; and
    a fourth dielectric layer configured as a protective layer, wherein the fourth dielectric layer is formed of silicon oxide.

2. The polarizer according to claim 1, wherein the metal wire strips are formed of material selected from a group consisting of aluminum, titanium, silver, gold, copper, and an alloy formed by one or more of these metals.

3. The polarizer according to claim 1, wherein the polarizer further comprises a protective layer on a side of the metal wire grid structure away from the base substrate.

4. The polarizer according to claim 3, wherein the protective layer is formed of a material selected from a group consisting of silicon oxide, silicon nitride, silicon oxynitride, an organic compound, and a mixture thereof, and the organic compound is thermal curing resin glue or light curing resin glue with a heat-resistant temperature greater than 100° C.

5. The polarizer according to claim 1, wherein the polarizer meets one or more of the following:
    two to four metal wire grid layers are provided;
    the metal wire strips in at least two or more of the plurality of metal wire grid layers have identical or different periods, and the periods are 40~200 nm;
    the metal wire strips in at least two or more of the plurality of metal wire grid layers have identical or different widths, and the widths are 20~150 nm;

the metal wire strips in at least two or more of the plurality of metal wire grid layers have identical or different heights, and the heights are 160~300 nm; and the metal wire strips in at least two or more of the plurality of metal wire grid layers have identical or different aspect ratios.

6. The polarizer according to claim 1, wherein a gap is provided between adjacent two metal wire strips of a same metal wire grid layer, and no dielectric layer is provided between the adjacent two metal wire strips.

7. A method of preparing a polarizer, comprising:
providing a base substrate, and
forming a metal wire grid structure on the base substrate, wherein the metal wire grid structure comprises:
  a plurality of metal wire grid layers, wherein each of the plurality of metal wire grid layers comprises a plurality of metal wire strips arranged periodically in a first direction parallel to a surface of the base substrate, and the plurality of metal wire grid layers are stacked in a second direction perpendicular to the surface of the base substrate, wherein orthographic projections of the plurality of metal wire strips of a first metal wire grid layer on the base substrate and orthographic projections of the plurality of metal wire strips of a second metal wire grid layer on the base substrate are overlapped with each other one by one, or orthographic projections of the plurality of metal wire strips of the first metal wire grid layer on the base substrate and orthographic projections of the plurality of metal wire strips of the second metal wire grid layer on the base substrate are complementary with each other; and
  a plurality of dielectric layers stacked between adjacent metal wire grid layers each with the plurality of metal wire strips,
wherein
the plurality of dielectric layers are selected from a group consisting of an inorganic compound dielectric layer, an organic compound dielectric layer, and a combination thereof, and the inorganic compound dielectric layer has an inorganic compound selected from a group consisting of silicon oxide, silicon nitride, silicon oxynitride, and a mixture thereof, and the organic compound dielectric layer has an organic compound which is thermal curing resin glue or light curing resin glue with a heat-resistant temperature greater than 100° C., and
the plurality of dielectric layers sequentially comprises, in a direction away from the base substrate:
a first dielectric layer formed as a protective layer, wherein the first dielectric layer is an inorganic compound dielectric layer formed of silicon oxide or silicon nitride, or an organic compound dielectric layer formed by thermal curing resin glue or light curing resin glue with a heat-resistant temperature greater than 100° C.;
a second dielectric layer formed as a planarization layer, wherein the second dielectric layer is formed by thermal curing resin glue or light curing resin glue with a heat-resistant temperature greater than 100° C.;
a third dielectric layer formed as a bonding promotion layer, wherein the third dielectric layer is formed of silicon nitride; and
a fourth dielectric layer formed as a protective layer, wherein the fourth dielectric layer is formed of silicon oxide.

8. The method according to claim 7, wherein the forming the metal wire grid structure on the base substrate comprises:
  alternately forming the plurality of metal wire grid layers and the plurality of dielectric layers of the metal wire grid structure on the base substrate.

9. The method according to claim 7, wherein the metal wire strips are formed by using a material selected from a group consisting of aluminum, titanium, silver, gold, copper, and an alloy formed by one or more of these metals.

10. The method according to claim 7, wherein the metal wire strips of at least one of the metal wire grid layers of the metal wire grid structure are formed by a nanoimprinting process.

11. The method according to claim 7, wherein the forming the plurality of dielectric layers of the metal wire grid structure is selected from one of the following:
  forming an inorganic compound dielectric layer by a chemical vapor deposition process,
  forming an organic compound dielectric layer by a spin coating process or a blade coating process, and
  forming an inorganic compound dielectric layer by a chemical vapor deposition process, and forming an organic compound dielectric layer by a spin coating process or a blade coating process.

12. The method according to claim 11, wherein the forming the plurality of dielectric layers of the metal wire grid structure is such that no dielectric layer is provided between adjacent metal wire strips.

13. The method according to claim 7, further comprising:
  forming a protective layer on a side of the metal wire grid structure away from the base substrate.

14. An electronic device, comprising a polarizer, wherein the polarizer comprises:
  a base substrate, and
  a metal wire grid structure provided on the base substrate, wherein the metal wire grid structure comprises:
    a plurality of metal wire grid layers, wherein each of the plurality of metal wire grid layers comprises a plurality of metal wire strips arranged periodically in a first direction parallel to a surface of the base substrate, and each of the plurality of metal wire grid layers is stacked in a second direction perpendicular to the surface of the base substrate, wherein orthographic projections of the plurality of metal wire strips of a first metal wire grid layer on the base substrate and orthographic projections of the plurality of metal wire strips of a second metal wire grid layer on the base substrate are overlapped with each other one by one, or orthographic projections of the plurality of metal wire strips of the first metal wire grid layer on the base substrate and orthographic projections of the plurality of metal wire strips of the second metal wire grid layer on the base substrate are complementary with each other; and
    a plurality of dielectric layers stacked between adjacent metal wire grid layers each with the plurality of metal wire strips,
  wherein
  the plurality of dielectric layers are selected from a group consisting of an inorganic compound dielectric layer, an organic compound dielectric layer, and a combination thereof, and the inorganic compound dielectric layer has an inorganic compound selected from a group consisting of silicon oxide, silicon nitride, silicon oxynitride, and a mixture thereof, and the organic compound dielectric layer has an organic compound which is thermal curing resin glue or light curing resin glue with a heat-resistant temperature greater than 100° C., and the plurality of dielectric layers sequentially comprises, in a direction away from the base substrate:

a first dielectric layer configured as a protective layer, wherein the first dielectric layer is an inorganic compound dielectric layer formed of a group consisting of silicon oxide or silicon nitride, or an organic compound dielectric layer formed by thermal curing resin glue or light curing resin glue with a heat-resistant temperature greater than 100° C.;

a second dielectric layer configured as a planarization layer, wherein the second dielectric layer is formed by thermal curing resin glue or light curing resin glue with a heat-resistant temperature greater than 100° C.;

a third dielectric layer configured as a bonding promotion layer, wherein the third dielectric layer is formed of silicon nitride; and a fourth dielectric layer configured as a protective layer, wherein the fourth dielectric layer is formed of silicon oxide.

15. The electronic device according to claim 14, wherein the electronic device comprises a liquid crystal display panel.

16. The electronic device according to claim 15, wherein the liquid crystal display panel is a double-cell type liquid crystal display panel.

17. The electronic device according to claim 16, wherein the double-cell type liquid crystal display panel further comprises an array substrate, the polarizer is provided on a side of the array substrate, or the array substrate forms a dielectric layer for providing the polarizer.

* * * * *